(12) United States Patent
Li et al.

(10) Patent No.: US 11,391,983 B2
(45) Date of Patent: Jul. 19, 2022

(54) COLOR FILM SUBSTRATE, MANUFACTURING METHOD THEREOF, DISPLAY PANEL AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ting Li, Beijing (CN); Yuanjie Xu, Beijing (CN); Pengcheng Zang, Beijing (CN); Yadong Zhang, Beijing (CN); Yao Li, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/211,456

(22) Filed: Mar. 24, 2021

(65) Prior Publication Data
US 2022/0050327 A1    Feb. 17, 2022

(30) Foreign Application Priority Data
Aug. 14, 2020  (CN) .......................... 202010818173.X

(51) Int. Cl.
*G02F 1/1335*    (2006.01)

(52) U.S. Cl.
CPC .. *G02F 1/133516* (2013.01); *G02F 1/133512* (2013.01)

(58) Field of Classification Search
None
See application file for complete search history.

(56) References Cited

U.S. PATENT DOCUMENTS

2020/0064541 A1* 2/2020 Jeon ...................... G02B 6/0036
2020/0292871 A1* 9/2020 Inoue ................ G02F 1/133512

FOREIGN PATENT DOCUMENTS

| KR | 101568747 B1 | * 11/2015 | |
| WO | WO-2020235686 A1 | * 11/2020 | ............. H05B 33/02 |
| WO | WO-2021027506 A1 | * 2/2021 | |

* cited by examiner

*Primary Examiner* — Shan Liu
(74) *Attorney, Agent, or Firm* — Myers Bigel, P.A.

(57) ABSTRACT

The present disclosure provides a color film substrate, a manufacturing method thereof, a display panel and a display device, and relates to the field of display technology. The color film substrate includes a base substrate, the base substrate being provided with an opening region, a black matrix, the black matrix being disposed on a surface of the base substrate, the black matrix including at least one annular opening surrounding the opening region, and the at least one annular opening spacing the black matrix apart from the opening region.

14 Claims, 3 Drawing Sheets

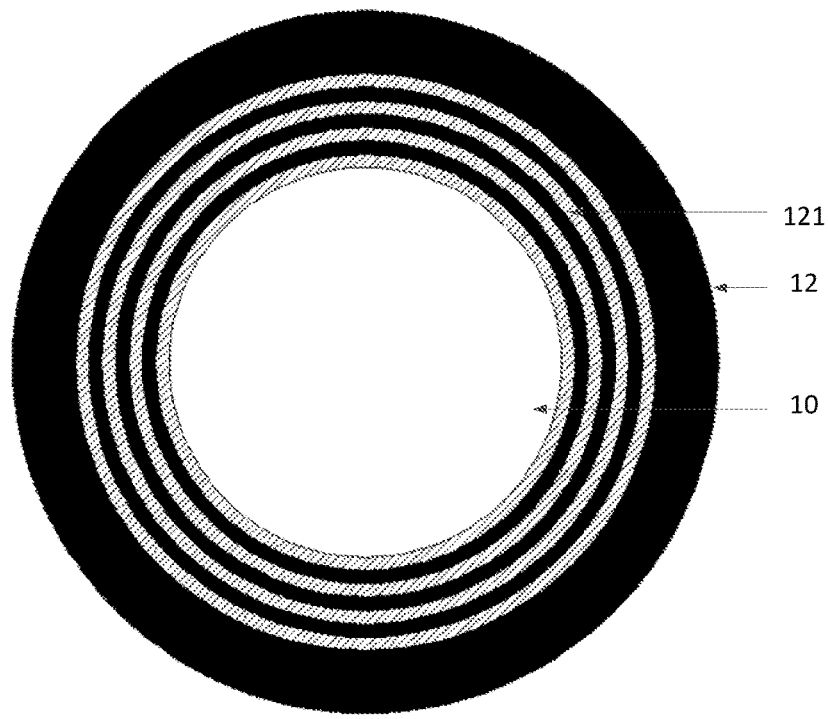
FIG. 3
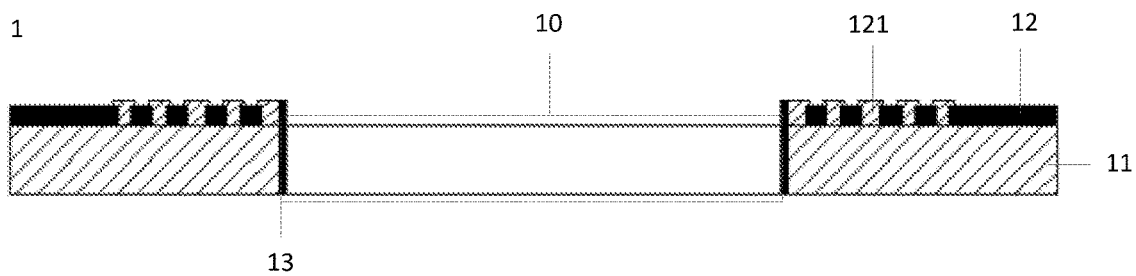
FIG. 4
providing a base substrate, disposing an opening region on the base substrate
disposing a black matrix on a surface of the base substrate, the black matrix comprising at least one annular opening surrounding the opening region, the at least one annular opening spacing the black matrix apart from the opening region
FIG. 5

COLOR FILM SUBSTRATE, MANUFACTURING METHOD THEREOF, DISPLAY PANEL AND DISPLAY DEVICE

RELATED APPLICATION

The present application claims the benefit of Chinese Patent Application No. 202010818173.X filed on Aug. 14, 2020, the entire disclosure of which is incorporated herein by reference.

TECHNICAL FIELD

The present disclosure relates to the field of display technology, especially to a color film substrate, a manufacturing method thereof, a display panel and a display device.

BACKGROUND

Liquid crystal display devices (LCDs) have a lot of advantages such as thin profile, saving power and no radiation, and therefore have been widely used. The liquid crystal display devices on the market include an array substrate and a color film substrate assembled with each other, and a liquid crystal layer located between the array substrate and the color film substrate.

At present, screen perforating technology is beginning to prevail. Generally, perforating is performed by subjecting glass to grinding or laser cutting. However, screen perforating will result in light leakage at a large viewing angle around the opening, which degrades the display effect of the screen and the user experience.

SUMMARY

The embodiments of the present disclosure provide a color film substrate, a manufacturing method thereof, a display panel and a display device, so as to alleviate light leakage at a large viewing angle around the opening caused by screen perforating.

A first aspect of the present disclosure provides a color film substrate including: a base substrate, the base substrate being provided with an opening region; a black matrix, the black matrix being disposed on a surface of the base substrate, the black matrix including at least one annular opening surrounding the opening region, and the at least one annular opening spacing the black matrix apart from the opening region.

In some embodiments, the color film substrate further includes: a first light shielding layer, the first light shielding layer being located in the at least one annular opening; wherein a material of the first light shielding layer is an insulating material.

In some embodiments, the color film substrate further includes: a color film layer; wherein the black matrix forms a plurality of sub-pixel regions distributed in an array on the base substrate, the color film layer includes a plurality of color resist units located in the plurality of sub-pixel regions, and the plurality of color resist units are in one-to-one correspondence with the plurality of sub-pixel regions; wherein the first light shielding layer and the color film layer are located in a same layer and made of a same material.

In some embodiments, the material of the first light shielding layer includes a blue color resist material.

In some embodiments, a number of the at least one annular opening is greater than two.

In some embodiments, each of the at least one annular opening is a closed annular region surrounding the opening region.

In some embodiments, each of the at least one annular opening is of a circularly annular shape, and the at least one annular opening is arranged concentrically.

In some embodiments, the first light shielding layer in the at least one annular opening covers an edge of the black matrix adjacent to the first light shielding layer.

In some embodiments, an opening wall of the opening region is provided with a second light shielding layer.

A second aspect of the present disclosure provides a method of manufacturing a color film substrate. The method includes: providing a base substrate, and disposing an opening region on the base substrate; and disposing a black matrix on a surface of the base substrate, the black matrix including at least one annular opening surrounding the opening region, and the at least one annular opening spacing the black matrix apart from the opening region.

A third aspect of the present disclosure provides a display panel. The display panel includes the color film substrate described in any of the foregoing embodiments; and an array substrate, the array substrate including an opening corresponding to the opening region.

A fourth aspect of the present disclosure provides a display device. The display device includes the display panel described in the above embodiment.

BRIEF DESCRIPTION OF THE DRAWINGS

In order to more clearly illustrate embodiments of the present disclosure or technical solutions in the prior art, the drawings to be used for description of the embodiments or the prior art will be briefly introduced below. Obviously, the drawings described below are only some embodiments of the present disclosure. A person having an ordinary skill in the art may also obtain other drawings based on these drawings without spending inventive efforts.

FIG. 3 is a schematic view illustrating the structure of a black matrix of a color film substrate provided by a further embodiment of the present disclosure;

FIG. 4 is a schematic view illustrating a sectional structure of a color film substrate provided by an embodiment of the present disclosure;

FIG. 5 is a flow chart of a manufacturing method of a color film substrate provided by an embodiment of the present disclosure.

DETAILED DESCRIPTION

Figure 1:
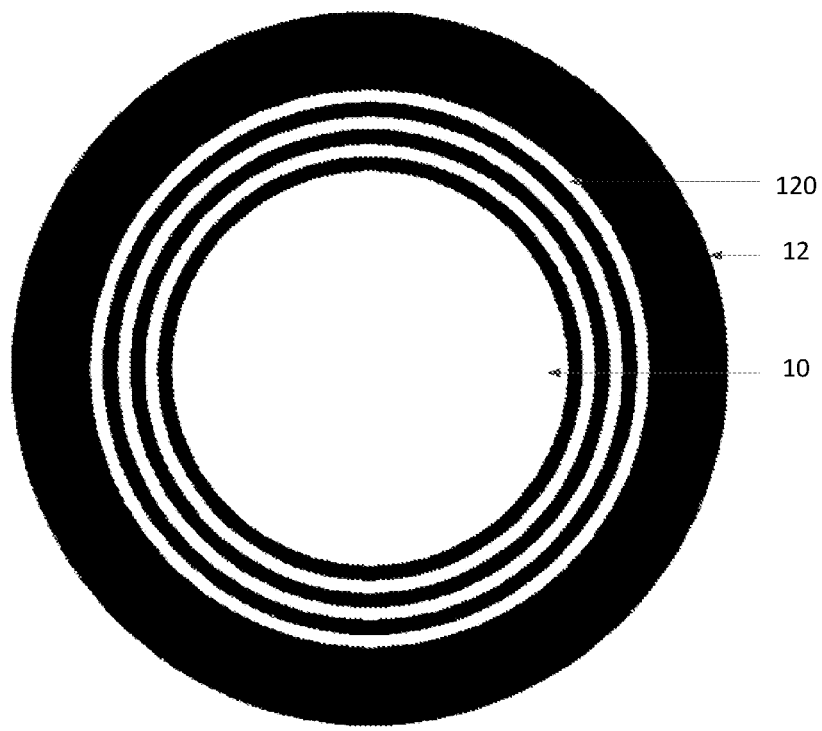
FIG. 1 is a schematic view illustrating the structure of a black matrix of a color film substrate provided by an embodiment of the present disclosure.

The technical solutions in embodiments of the present disclosure will be described clearly and comprehensively below in conjunction with the drawings in the embodiments of the present disclosure. Obviously, the described embodiments are only part of the embodiments of the present disclosure, rather than all of them. All other embodiments obtained by a person having an ordinary skill in the art based on the embodiments of the present disclosure without spending inventive efforts fall within the protection scope of the present disclosure. It is to be noted that, unless otherwise specified, the technical terms or scientific terms used in the present disclosure should have usual meanings understood by a skilled person in the technical field to which the present disclosure pertains.

First Embodiment

Referring to FIGS. 1 to 4, the first embodiment of the present disclosure proposes a color film substrate 1. The color film substrate 1 includes: a base substrate 11, the base substrate 11 being provided with an opening region 10; a black matrix 12, the black matrix 12 being disposed on a surface of the base substrate 11, the black matrix 12 including at least one annular opening 120 surrounding the opening region 10, and the at least one annular opening 120 spacing the black matrix 12 apart from the opening region 10.

In the embodiment of the present disclosure, the at least one annular opening 120 is used to space the black matrix 12 apart from the opening region 10. In addition, the at least one annular opening 120 can also be used to divide the black matrix 12 located in the peripheral area of the opening region 10.

Specifically, the color film substrate 1 provided by this embodiment is a color filter (CF) substrate of a liquid crystal display panel. The color film substrate 1 generally includes a base substrate 11, a black matrix 12 (BM) formed on the base substrate 11, and a color film layer 14. The color film layer 14 includes a plurality of color resist units of different colors, for example, red, green and blue color resist units formed using red, green and blue color resists, respectively. The black matrix 12 has a high light shielding performance, and a portion thereof corresponding to the display region is used to define the boundary between color resist units. In order to prevent light leakage between adjacent color resist units, a portion of the black matrix 12 corresponding to the non-display region is used to avoid light leakage on the edge side of the screen. The base substrate 11 is provided with an opening region 10. The opening region 10 may be disposed in the display region of the base substrate 11 to form a non-display portion in the display region, which is especially applicable to display devices without borders. Alternatively, the opening region 10 may also be disposed in the non-display region, which is not specifically limited here. The opening region 10 is a perforating position of the display panel. After the color film substrate 1 is assembled with the array substrate 2, it is possible to form the opening region by performing a grinding or laser cutting process on the color film substrate 1 and the array substrate 2. The opening region can be used to set up cameras, earpieces, sensors and other devices, so as to achieve the effect of increasing the screen-to-body ratio of the display device, thereby improving the user's visual experience. Display panels and display devices are often affected by static electricity during production, manufacturing, transportation and use. Although the black matrix 12 has an insulating property, the black matrix 12 includes conductive carbon particles and cannot block part of high-voltage static electricity. After the opening region 10 is disposed, the black matrix 12 on the base substrate 11 is also perforated correspondingly. When the black matrix 12 is being disposed, if the black matrix 12 extends to the periphery of the opening region 10, static electricity is easily introduced into the display region through the black matrix 12 and the opening region 10. When the static electricity value reaches a certain level, it will affect the electric field of the display region, such that the display region of the display device produces images with poor quality. In order to avoid the influence on the display effect, in the technical solution of the present disclosure, at least one annular opening 120 surrounding the opening region 10 is arranged in a portion of the black matrix 12 located on the periphery of the opening region 10. The black matrix 12 is spaced apart from the opening region 10 by the annular opening 120. The annular opening 120 can also divide the black matrix 12 located in the peripheral area of the opening region 10, so that the black matrix 12 is arranged in a discontinuous form. In this way, conduction of static electricity is blocked to prevent conduction of static electricity to the display region.

Further, in order to avoid light leakage at a large viewing angle around the opening caused by the annular opening 120 of the black matrix 12, a first light shielding layer 121 is provided in the at least one annular opening 120 to cover the at least one annular opening 120 to achieve light shielding for the annular opening 120. In addition, the first light shielding layer 121 is made of an insulating material. The insulating material has a better insulating property than the black matrix 12, which can plays a blocking role between the black matrix 12 and the opening region 10, and reliably avoid conduction of static electricity to the display region, thereby ensuring the display effect of the display region.

As stated above, by arranging the first light shielding layer 121 made of an insulating material in the at least one annular opening 120, light leakage at a large viewing angle around the opening region 10 can be avoided while further avoiding conduction of static electricity to the display region, which can improve the display effect of the screen and the user experience.

Figure 6:
FIG. 6 is a schematic view illustrating a sectional structure of a display panel provided by an embodiment of the present disclosure.

Further, referring to FIG. 4 and FIG. 6, upon implementation, the color film substrate 1 proposed by this embodiment further includes: a color film layer 14, the black matrix 12 forming a plurality of sub-pixel regions distributed in an array on the base substrate 11, the color film layer 14 including a plurality of color resist units 141 located in the plurality of sub-pixel regions, and the plurality of color resist units 141 being in one-to-one correspondence with the plurality of sub-pixel regions; wherein the first light shielding layer 121 is located in a same layer and made of a same material as the color film layer 14.

Specifically, in order to reduce the process difficulty and cost for manufacturing the color film substrate 1, in the technical solution of the present disclosure, during the manufacturing process of the color film substrate 1, after the black matrix 12 has been made, the color film layer 14 needs to be fabricated. The color film layer 14 includes a plurality of color resist units 141 of different colors, for example, red, green and blue color resist units formed using red, green and blue color resists, respectively. The black matrix 12 forms a plurality of sub-pixel regions distributed in an array on the base substrate for defining the boundaries between color resist units. In order to prevent light leakage between adjacent color resist units, the edge of a light filter unit will usually be overlapped on the black matrix 12. Thus, the first light shielding layer 121 may be made of a color resist material. Therefore, after the black matrix 12 is formed, in the process of fabricating the color film layer 14, a color resist material can be used to fill the annular opening 120 through the same process step to form the first light shielding layer 121. Compared with forming the first light shielding layer 121 with an additionally added material, the cost and process difficulty can be effectively reduced, and the yield can be increased. Furthermore, in the process of this step, a color resist material can be used to completely cover the annular opening 120 and the opening region 10. In the subsequent perforating process, the opening region 10 can be directly subjected to grinding or cutting. As a result, the gap between the first light shielding layer 121 and the opening region 10 can be minimized, which can reliably solve the problem of light leakage around the opening.

Further, upon implementation, the material of the first light shielding layer 121 includes a blue color resist material. The first light shielding layer 121 is made of a blue color resist material, or made of a blue color resist material superimposed with at least one other color resist material.

Specifically, as stated above, the material of the first light shielding layer 121 may be a color resist material. In order to further improve the light shielding effect of the first light shielding layer 121, in the technical solution of the present disclosure, the color film layer 14 usually includes red, green and blue color resist units formed of red, green and blue color resist materials. Blue is a color to which human eyes are most insensitive. Therefore, a blue color resist material may be used to form the first light shielding layer 121. As a result, light leakage from the first light shielding layer 121 can be effectively avoided, so that the first light shielding layer 121 has a reliable light shielding effect, which can ensure the display effect of the display panel, but the present disclosure is not limited thereto. The first light shielding layer 121 may also use a blue color resist material superimposed with a red color resist material, or superimposed red, green and blue color resist materials. Alternatively, the first light shielding layer 121 may also be made of color resists of other colors with poor human eye sensitivity to ensure a reliable light shielding performance.

Figure 2:
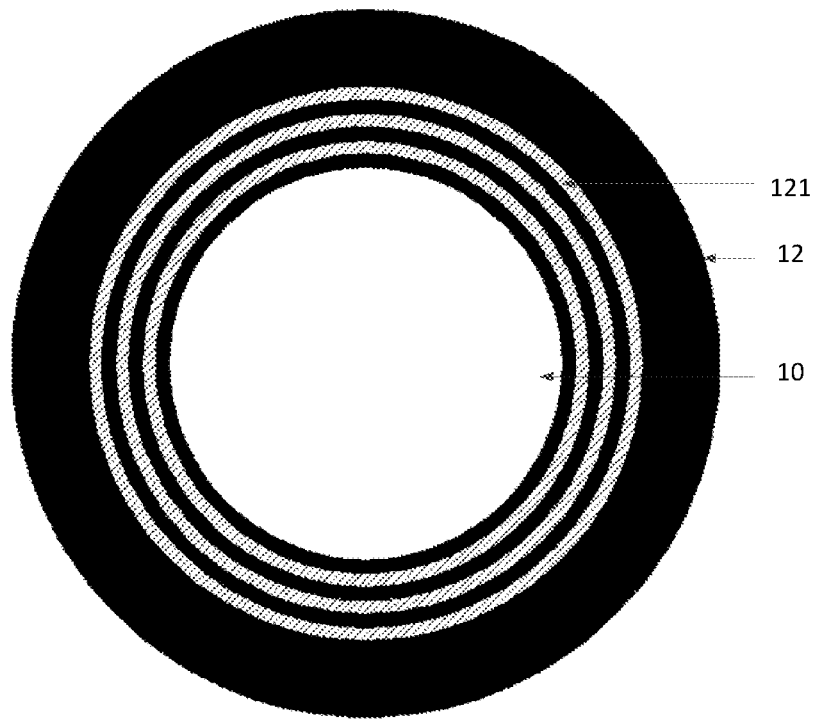
FIG. 2 is a schematic view illustrating the structure of a black matrix of a color film substrate provided by another embodiment of the present disclosure.

Further, referring to FIGS. 1 to 3, upon implementation, the number of the at least one annular opening 120 is greater than two. One of the annular openings 120 can be used to space the black matrix 12 apart from the opening region 10, and the remaining annular openings 120 can be used to divide the black matrix 12 located in a peripheral preset area of the opening region 10. Alternatively, a plurality of annular openings 120 are used respectively to divide the black matrix 12 located in a peripheral preset area of the opening region 10.

Specifically, the number of the at least one annular opening 120 may also be one, so that it can block conduction of static electricity while shielding light. In the technical solution of the present disclosure, in order to further avoid conduction of static electricity and improve the display effect of the display region of the display device, the number of the at least one annular opening 120 may also be set to be greater than two. The plurality of annular openings 120 are all arranged around the opening region 10. Referring to FIG. 3, the annular opening 120 closest to the opening region 10 can be used to space the black matrix 12 apart from the opening region 10, and the remaining annular openings 120 can divide the black matrix 12 in the peripheral preset area close to the opening region 10 into several portions, which can further reduce conduction of static electricity. Alternatively, referring to FIG. 2, the plurality of annular openings 120 may all be used to divide the black matrix 12 in the peripheral preset area of the opening region 10 to gradually form a blocking effect against static electricity conduction. The specific size of the aforementioned preset area may be set according to practical situations. Compared with arranging only one annular opening 120 in the same peripheral area of the opening region 10, the arrangement of a plurality of annular openings 120 achieves a significantly improved blocking effect against static electricity. Since the light shielding effect of the black matrix 12 is higher than that of the blue color resist material, the arrangement of a plurality of annular openings 120 can also effectively improve the light shielding effect of the peripheral area of the opening region 10. Optionally, in the peripheral area around the opening region 10, each annular opening 120 has a "slit" shape. Therefore, as the number of the annular openings 120 is increased, the ring width of the annular opening 120 is reduced, so as to maximize the light shielding effect while blocking static electricity.

Further, referring to FIG. 1, upon implementation, each of the at least one annular opening 120 is a closed annular region surrounding the opening region 10.

Specifically, in the technical solution of the present disclosure, since the annular opening 120 surrounds the opening region 10, the annular opening 120 may be set as an annular region arranged around the opening region 10. The annular region is a closed annular region, so as to space the black matrix 12 apart from the opening region 10 or divide the black matrix 12. Optionally, the inner contour shape of the annular opening 120 for spacing the black matrix 12 apart from the opening region 10 should be consistent with the opening shape of the opening region 10. The outer contour shape of the annular opening 120 may be the same as the inner contour shape of the annular opening 120, but may also be different, which is not specifically limited here. The shape of the annular opening 120 for dividing the black matrix 12 may also be set according to practical situations, as long as it is a closed annular region and can divide the corresponding area. In case a plurality of annular openings 120 are arranged, the shape of each annular opening 120 and the ring width of each annular region may be the same or different. The ring width (i.e., the distance between the outer contour and the inner contour) of the circularly annular opening 120 may be in the range of 5 to 100 microns.

Further, referring to FIG. 1, upon implementation, the annular opening 120 is of a circularly annular shape, and the at least one annular opening 120 is arranged concentrically.

Specifically, the shape of the screen opening is usually a circular opening, and therefore, the shape of the opening region 10 may be a circular region. In the technical solution of the present disclosure, the shape of the annular opening 120 may be set to a circularly annular shape that matches the shape of the opening region 10. In case a plurality of annular openings 120 are arranged, each of the annular openings 120 is set to have a circularly annular shape, and the plurality of annular openings are arranged concentrically. The center of circle may be set on the axis of the opening of the opening region 10 to make the overall structure more regular and reduce the process difficulty.

Further, referring to FIG. 4, upon implementation, the first light shielding layer 121 in the at least one annular opening 120 covers the edge of the black matrix 12 adjacent to the first light shielding layer.

Specifically, in order to further improve the light shielding effect of the first light shielding layer 121 and avoid light leakage at the junction of the first light shielding layer 121 and the black matrix 12, in the technical solution of the present disclosure, the first light shielding layer 121 completely covers the annular opening 120. In addition, the edge of the first light shielding layer 121 may also extend to an adjacent black matrix 12 and cover the edge of the adjacent black matrix 12 so that the first light shielding layer 121 and the black matrix 12 at least partially overlap. Similarly, in the display region, the edge of a light filter unit will usually also be overlapped on the black matrix 12. Therefore, the process has low difficulty and high yield. Moreover, by covering the edge of the adjacent black matrix 12 by the first light shielding layer 121, light leakage at the junction of the first light shielding layer 121 and the black matrix 12 can be avoided, which can further improve the overall light shielding effect of them and avoid light leakage around the opening region 10.

Further, referring to FIG. 4, upon implementation, the opening wall of the opening region 10 is provided with a second light shielding layer 13.

Specifically, in order to further avoid light leakage around the opening region 10, in the technical solution of the present disclosure, after the perforating process, an opaque material may be used to coat the opening wall to form a second light shielding layer 13. As a result, light leakage can be further reduced, and light leakage at a large viewing angle can be avoided. Further, the second light shielding layer 13 may be made of an opaque ink material. The material of the second light shielding layer 13 may specifically be an organic pigment, an inorganic pigment or a dye, and the material may be azo-based, phthalocyanine-based pigments, titanium white, cadmium red, chrome green, ultramarine blue, etc., but is not limited thereto. The coating process is relatively mature, which is high in precision and can reduce the manufacturing cost.

Second Embodiment

Referring to FIG. 5, the second embodiment of the present disclosure proposes a method of manufacturing a color film substrate. The manufacturing method of the color film substrate includes: step 1, providing a base substrate 11, and disposing an opening region 10 on the base substrate 11; step 2, disposing a black matrix 12 on a surface of the base substrate 11, the black matrix 12 including at least one annular opening 120 surrounding the opening region 10, and the at least one annular opening 120 spacing the black matrix 12 apart from the opening region 10.

Specifically, when manufacturing the color film substrate 1 described above, a base substrate 11 is first provided. The position of the opening region 10 of the base substrate 11 is set according to the position that needs to be perforated later, and a black matrix 12 is disposed on the surface of the base substrate 11. A portion of the black matrix 12 corresponding to the display region forms a plurality of sub-pixel regions distributed in an array on the base substrate 11. A portion of the black matrix 12 corresponding to the opening region 10 forms at least one annular opening 120 surrounding the opening region on the base substrate 11.

After the black matrix 12 is formed, a color resist material may be further used to fill the annular opening 120 and the sub-pixel region to form a first light shielding layer 121 and a color film layer 14. Thus, the first light shielding layer 121 and the color film layer 14 may be made of the same process and the same material. While forming the first light shielding layer 121 to avoid conduction of static electricity to the display region and light leakage at a large viewing angle around the opening region, the cost and process difficulty are reduced, and the yield is improved. After the color film substrate 1 has been fabricated and assembled with the array substrate 2, the corresponding opening region 10 of the array substrate 2 and the color film substrate 1 may be perforated using a grinding or laser cutting process.

Third Embodiment

Referring to FIG. 6, the third embodiment of the present disclosure proposes a display panel. The display panel includes: the color film substrate 1 as described in any of the foregoing embodiments; and an array substrate 2, the array substrate 2 including an opening corresponding to the opening region 10.

Specifically, the display panel provided by this embodiment may be a liquid crystal display panel. The structure of the liquid crystal display panel mainly includes: an array substrate 2, a color film substrate 1, a backlight source, and the like. The color film substrate 1 is disposed on the array substrate 2. A liquid crystal layer 3 is sealed and sandwiched between the color film substrate 1 and the array substrate 2 to form a display region. The backlight can provide a light source. When the color film substrate 1 is assembled with the array substrate 2, the black matrix 12 of the color film substrate 1 is located on a surface close to the array substrate 2. After assembling, the corresponding opening region 10 of the array substrate 2 and the color film substrate 1 may be perforated using a grinding or laser cutting process. The opening region 10 can be used to set up cameras, earpieces, sensors and other devices. By arranging at least one annular opening 120 surrounding the opening region 10 on the black matrix 12 of the color film substrate 1, it is possible to space the black matrix 12 apart from the opening region 10, and/or divide the black matrix 12 in the peripheral area of the opening region 10, so as to prevent static electricity from being introduced into the display region through the black matrix 12 and the opening region 10. By arranging a first light shielding layer 121 made of an insulating material in the at least one annular opening 120, it is possible to avoid light leakage at a large viewing angle around the opening region 10 while further preventing conduction of static electricity to the display region, thereby improving the display effect of the display panel and the user experience.

Further, referring to FIG. 6, after the perforating process is performed for the array substrate 2 and the color film substrate 1, an opaque material may be used to coat the opening walls of the array substrate 2 and the color film substrate 1 to form a second light shielding layer 13, which can further reduce light leakage to avoid light leakage at a large viewing angle.

Fourth Embodiment

The fourth embodiment of the present disclosure provides a display device. The display device includes the display panel described in the above embodiment.

Specifically, the display device may be a liquid crystal display device (LCD) using the display panel described above, for example, it may be a device with a display function such as a mobile phone, a tablet computer, a smart wearable device, an in-vehicle electronic device, and the like. The opening region 10 is disposed in the array substrate 2 and the color film substrate 1 in the non-display region of the display panel correspondingly, which can be used for accommodating devices such as cameras, thereby increasing the screen-to-body ratio of the display device and enhancing the user's visual experience. By arranging at least one annular opening 120 surrounding the opening region 10 on the black matrix 12 of the color film substrate 1, it is possible to space the black matrix 12 apart from the opening region 10, and/or divide the black matrix 12 in the peripheral area of the opening region 10, so as to prevent static electricity from being introduced into the display region through the black matrix 12 and the opening region 10. By arranging a first light shielding layer 121 made of an insulating material in the at least one annular opening 120, it is possible to avoid light leakage at a large viewing angle around the opening region 10 while further preventing conduction of static electricity to the display region, thereby improving the display effect of the display panel and the user experience.

It is to be noted that, in the description of this specification, the orientations or positional relationships indicated by the terms "upper", "lower", etc. are based on the orientations or positional relationships shown in the drawings, and only for the convenience of describing the present disclosure and simplifying the description, rather than indicating or implying that the device or element referred to must have a specific orientation, and be constructed and operated in a specific orientation, and therefore cannot be understood as a limitation to the present disclosure; the terms "connect", "install", "fix", etc. should all be understood in a broad sense, for example, "connect" may be a fixed connection, a detachable connection, or an integral connection; it may be a direct connection or an indirect connection through an intermediate medium. For a person having an ordinary skill in the art, specific meanings of the above-mentioned terms in the present disclosure can be understood according to specific circumstances.

In the description of this specification, the description of the terms "an embodiment", "some embodiments", "specific embodiments", etc. means that specific features, structures, materials or characteristics described in conjunction with the embodiment or example are included in at least one embodiment or example of the present disclosure. In this specification, the schematic representations of the above-mentioned terms do not necessarily refer to the same embodiment or example. Moreover, the described specific features, structures, materials or characteristics can be combined in any one or more embodiments or examples in a suitable manner.

What have been stated above are only specific embodiments of the present disclosure, but the protection scope of the present disclosure is not limited thereto. Any variations or substitutions that can be easily conceived by those skilled in the art familiar with this technical field within the technical scope revealed by the present disclosure should be encompassed within the protection scope of the present disclosure. Thus, the protection scope of the present disclosure should be based on the protection scope of the claims.

What is claimed is:

1. A color film substrate, comprising:
   a base substrate, the base substrate comprising an opening region;
   a black matrix, and
   a color film layer,
   wherein the black matrix forms a plurality of sub-pixel regions distributed in an array on the base substrate, the color film layer comprises a plurality of color resist units in the plurality of sub-pixel regions, and the plurality of color resist units are in one-to-one correspondence with the plurality of sub-pixel regions,
   wherein the black matrix is on a surface of the base substrate,
   wherein the black matrix comprises at least one annular opening surrounding the opening region,
   wherein the at least one annular opening spaces the black matrix apart from the opening region, and
   wherein a number of the at least one annular opening is greater than two, each of the at least one annular opening is a closed annular region surrounding the opening region, each of the at least one annular opening is of a circularly annular shape, and the at least one annular opening is arranged concentrically.

2. The color film substrate according to claim 1, further comprising:
   a first light shielding layer,
   wherein the first light shielding layer is in the at least one annular opening; and
   wherein a material of the first light shielding layer comprises an insulating material.

3. The color film substrate according to claim 2,
   wherein the first light shielding layer and the color film layer are in a same layer and made of a same material.

4. The color film substrate according to claim 3, wherein the material of the first light shielding layer comprises a blue color resist material.

5. The color film substrate according to claim 2, wherein the first light shielding layer in the at least one annular opening covers an edge of the black matrix adjacent to the first light shielding layer.

6. The color film substrate according to claim 1, wherein an opening wall of the opening region is provided with a second light shielding layer.

7. A display panel, comprising:
   the color film substrate according to claim 1; and
   an array substrate, the array substrate comprising an opening corresponding to the opening region.

8. The display panel according to claim 7, further comprising:
   a first light shielding layer,
   wherein the first light shielding layer is in the at least one annular opening, and
   wherein a material of the first light shielding layer comprises an insulating material.

9. The display panel according to claim 8,
   wherein the first light shielding layer and the color film layer are in a same layer and made of a same material.

10. The display panel according to claim 9, wherein the material of the first light shielding layer comprises a blue color resist material.

11. The display panel according to claim 8, wherein the first light shielding layer in the at least one annular opening covers an edge of the black matrix adjacent to the first light shielding layer.

12. The display panel according to claim 7, wherein an opening wall of the opening region is provided with a second light shielding layer.

13. A display device comprising the display panel according to claim 7.

14. A method of manufacturing a color film substrate, comprising:
    providing a base substrate;
    disposing an opening region on the base substrate;
    disposing a black matrix on a surface of the base substrate, and
    disposing a color film layer on the base substrate,
    wherein the black matrix forms a plurality of sub-pixel regions distributed in an array on the base substrate, the color film layer comprises a plurality of color resist units in the plurality of sub-pixel regions, and the plurality of color resist units are in one-to-one correspondence with the plurality of sub-pixel regions,
    wherein the black matrix comprises at least one annular opening surrounding the opening region,
    wherein the at least one annular opening spaces the black matrix apart from the opening region, and
    wherein a number of the at least one annular opening is greater than two, each of the at least one annular opening is a closed annular region surrounding the opening region, each of the at least one annular opening is of a circularly annular shape, and the at least one annular opening is arranged concentrically.

\* \* \* \* \*